United States Patent [19]

Havens et al.

[11] Patent Number: 5,745,198
[45] Date of Patent: Apr. 28, 1998

[54] LIQUID CRYSTAL COMPOSITE AND METHOD OF MAKING

[75] Inventors: John Havens, Menlo Park, Calif.; Kathleen Di Zio, Sunderland, Mass.; Anne Gonzales, Pleasanton, Calif.; Robert H. Reamey, Palo Alto, Calif.; Harriette Atkins, Mountain View, Calif.; Jinlong Cheng, Freemont, Calif.

[73] Assignee: Raychem Corporation, Menlo Park, Calif.

[21] Appl. No.: 672,147

[22] Filed: Jun. 27, 1996

Related U.S. Application Data

[62] Division of Ser. No. 217,268, Mar. 24, 1994, Pat. No. 5,585,947.

[51] Int. Cl.$^6$ .................... G02F 1/137; C09K 19/54
[52] U.S. Cl. ............................. 349/90; 349/92
[58] Field of Search ................. 349/51, 52, 74, 349/98, 102, 86, 89, 90, 92, 93; 445/24, 25; 430/20; 428/1; 252/299.01, 299.1, 299.5; 264/4.1, 4.32, 4.33, 4.6

[56] References Cited

U.S. PATENT DOCUMENTS

| | | | |
|---|---|---|---|
| 4,435,047 | 3/1984 | Fergason | 350/334 |
| 4,643,528 | 2/1987 | Bell, Jr. | 350/334 |
| 4,688,900 | 8/1987 | Doane et al. | 350/347 V |
| 4,818,070 | 4/1989 | Gunjima et al. | 350/334 |
| 4,834,509 | 5/1989 | Gunjima et al. | 350/347 V |

(List continued on next page.)

FOREIGN PATENT DOCUMENTS

| | | | |
|---|---|---|---|
| 0313053 A2 | 4/1989 | European Pat. Off. | G02F 1/133 |
| 0357234 A2 | 3/1990 | European Pat. Off. | G02F 1/133 |
| 0421240 A2 | 10/1991 | European Pat. Off. | G02F 1/1333 |
| 3-288823 | 12/1991 | Japan | G02F 1/1333 |
| 4-007518 | 1/1992 | Japan | G02F 1/333 |
| 4-240614 | 8/1992 | Japan | G02F 1/1333 |
| 6-003652 | 1/1994 | Japan | G02F 1/1333 |
| WO 92/14184 | 8/1992 | WIPO | G02F 1/133 |
| WO 93/18431 | 9/1993 | WIPO | G02F 1/1333 |

OTHER PUBLICATIONS

Adomenas et al., "Influence Of Plasticizers On The Values Of Operational Voltages Of Microencapsulated Liquid Crystals," *Mol. Cryst. Liq. Cryst.*, vol. 215, pp. 153–160 (1992) no month.

Schadt et al., "Influence Of Solutes On Material Constants Of Liquid Crystals And On Electro–Optical Properties Of Twisted Nematic Displays," *J. Chem. Phys.*, vol. 65, No. 6, pp. 2224–2230 (1976) no month.

Koval'chuk et al., "Electrooptical Effects In The Polymer Dispersed Nematic Liquid Crystals: Response Time," *Mol. Cryst. Liq. Cryst.*, vol. 193, pp. 217–221 (1990) no month.

Nomura et al., "Interfacial Interaction Between Nematic Liquid Crystal And Polymer In The Composite Film Consisting Of Nematic Liquid Crystal And Connected Polymer Microspheres," *Jap. J. Appl. Phys.*, vol. 30, No. 2, pp. 327–330 (Feb. 1991).

Hirai et al., "Phase Diagram And Phase Separation in LC/Prepolymer Mixture," *SPIE Vol. 1257 Liq. Cryst. Displays and Applications*, pp. 2–8 (1990) no month.

Derwent Abstract AN 89–280957, no date available.

*Primary Examiner*—William L. Sikes
*Assistant Examiner*—Tai V. Duong
*Attorney, Agent, or Firm*—Herbert G. Burkard; Yuan Chao

[57] ABSTRACT

A method is disclosed for making a liquid crystal composite in which droplets of a liquid crystal material are dispersed in a polymer matrix. At least one further material separates the liquid crystal material from the polymer matrix. This construction permits the polymer matrix to be selected on the basis of its environmental properties and the further material to be selected on the basis of its orientational interactions with liquid crystal material. Light valves made from such a composite exhibit improved electro-optical properties.

12 Claims, 7 Drawing Sheets

U.S. PATENT DOCUMENTS

| | | | |
|---|---|---|---|
| 4,850,683 | 7/1989 | Kawaguchi et al. | 350/350 R |
| 4,888,126 | 12/1989 | Mullen et al. | 252/299.01 |
| 4,950,052 | 8/1990 | Fergason et al. | 350/334 |
| 4,992,201 | 2/1991 | Pearlman | 252/299.1 |
| 5,018,840 | 5/1991 | Ogawa | 350/349 |
| 5,178,571 | 1/1993 | Mase | 445/24 |
| 5,202,063 | 4/1993 | Andrews et al. | 264/4.6 |
| 5,206,747 | 4/1993 | Wiley et al. | 359/51 |
| 5,216,530 | 6/1993 | Pearlman et al. | 359/43 |
| 5,253,090 | 10/1993 | Yamazaki et al. | 359/52 |
| 5,270,843 | 12/1993 | Wang | 359/52 |
| 5,335,101 | 8/1994 | Reamey | 359/52 |
| 5,405,551 | 4/1995 | Reamey et al. | 252/299.01 |
| 5,410,424 | 4/1995 | Konuma et al. | 359/51 |
| 5,427,713 | 6/1995 | Wartenberg et al. | 359/52 |
| 5,479,278 | 12/1995 | Takeuchi et al. | 359/52 |

LIQUID CRYSTAL COMPOSITE AND METHOD OF MAKING

CROSS-REFERENCE TO RELATED APPLICATIONS

This application is a divisional of application Ser. No. 08/217,268, filed Mar. 24, 1994, now U.S. Pat. No. 5,585,947, issued Dec. 17, 1996, the disclosure of which is incorporated herein by reference.

TECHNICAL FIELD OF THE INVENTION

This invention relates to liquid crystal composites suitable for use in light valves and methods of making the same.

BACKGROUND OF THE INVENTION

Liquid crystal light valves in which the electro-optically active element is a liquid crystal composite are known. The composite comprises plural volumes or droplets of a liquid crystal material dispersed, encapsulated, embedded, or otherwise contained within a polymer matrix. Exemplary disclosures include Fergason, U.S. Pat. No. 4,435,047 (1984) ("Fergason '047"); West et al., U.S. Pat. No. 4,685,771 (1987); Pearlman, U.S. 4,992,201 (1991); Dainippon Ink, EP 0,313,053 (1989). These light valves may be used in displays and window or privacy panels.

The prior art also discloses the concept of having a further material disposed between the polymer matrix and the liquid crystal material. See, for example, Fergason, '047; Fergason et al., U.S. Pat. No. 4,950,052 (1990) ("Fergason '052"); and Raychem, WO 93/18431 (1993) ("Raychem '431"). The purpose of having this further material has been variously stated as preserving the integrity of the volumes of liquid crystal material and for altering the electro-optical properties of the composite.

However, the techniques disclosed for forming a composite with this intervening further material have been specialized and are not generally applicable to a wide variety of materials. The present invention provides an improved and more generally applicable process for making such composites.

SUMMARY OF THE INVENTION

There is provided a method for making a liquid crystal composite wherein plural volumes of liquid crystal material are dispersed in an encapsulating material and the liquid crystal material is at least partially separated from the encapsulating material by an interfacial material disposed therebetween, which method comprises the steps of:

(a) forming an emulsion comprising the encapsulating material, the interfacial material or a precursor thereof, the liquid crystal material, and an aqueous carrier medium, under conditions such that (i) plural volumes of the liquid crystal material are contained by the encapsulating material and (ii) the interfacial material or a precursor thereof forms a homogeneous solution with the liquid crystal material and optionally a solvent in which the interfacial material or precursor thereof and the liquid crystal material are mutually soluble;

(b) causing the interfacial material or precursor thereof to phase separate from the liquid crystal material and deposit between the liquid crystal material and the encapsulating material by either evaporating the solvent or reducing the temperature of the emulsion to a lower temperature at which the interfacial material or precursor thereof is insoluble in the liquid crystal material;

(c) polymerizing the precursor of the interfacial material to form the interfacial material, where such precursor is present; and (d) removing the aqueous carrier medium.

In a first preferred embodiment, the method comprises the steps of:

(a) forming an emulsion comprising the encapsulating material, the interfacial material, the liquid crystal material, and the aqueous carrier medium, under conditions such that (i) plural volumes of the liquid crystal material are contained by the encapsulating material and (ii) the interfacial material forms a homogeneous solution with the liquid crystal material and a solvent in which the interfacial material and liquid crystal material are mutually soluble;

(b) causing the interfacial material to phase separate from the liquid crystal material and deposit between the liquid crystal material and the encapsulating material by evaporating the solvent; and (c) removing the aqueous carrier medium.

In a second preferred embodiment, the method comprises the steps of:

(a) forming an emulsion comprising the encapsulating material, the interfacial material precursor, the liquid crystal material, and the aqueous carrier medium, under conditions such that (i) plural volumes of the liquid crystal material are contained by the encapsulating material and (ii) the interfacial material precursor forms a homogeneous solution with the liquid crystal material and a solvent in which the interfacial material precursor and liquid crystal material are mutually soluble;

(b) causing the interfacial material precursor to phase separate from the liquid crystal material and deposit between the liquid crystal material and the encapsulating material by evaporating the solvent;

(c) polymerizing the interfacial material precursor to form the interfacial material; and (d) removing the aqueous carrier medium.

In a third preferred embodiment, the method comprises the steps of:

(a) forming an emulsion comprising the encapsulating material, the interfacial material, the liquid crystal material, and the aqueous carrier medium, at or above a first temperature $T_1$, under conditions such that (i) plural volumes of the liquid crystal material are contained by the encapsulating material and (ii) the interfacial material forms a homogeneous solution with the liquid crystal material;

(b) causing the interfacial material to phase separate from the liquid crystal material and deposit between the liquid crystal material and the encapsulating material by lowering the temperature of the emulsion to a second temperature $T_2$ at or below which the interfacial material is insoluble in the liquid crystal material; and (c) removing the aqueous carrier medium.

In a fourth preferred embodiment, the method comprises the steps of:

(a) forming an emulsion comprising the encapsulating material, an interfacial material precursor, the liquid crystal material, and the aqueous carrier medium, at or above a first temperature $T_1$, under conditions such that (i) plural volumes of the liquid crystal material are dispersed in the encapsulating material and (ii) the interfacial material precursor forms a homogeneous solution with the liquid crystal material;

(b) causing the interfacial material precursor to phase separate from the liquid crystal material and deposit between the liquid crystal material and the encapsulating material by lowering the temperature of the emulsion to a second temperature $T_2$ at or below which the interfacial material precursor is insoluble in the liquid crystal material;

(c) polymerizing the interfacial material precursor to form the interfacial material; and (d) removing the aqueous carrier medium.

In another embodiment, there is provided a liquid crystal composite comprising plural volumes of liquid crystal material dispersed in a matrix material, wherein the liquid crystal material is at least partially separated from the matrix material by an interfacial material and an encapsulating material successively disposed around the liquid crystal material.

In yet another embodiment, there is provided a method of making a liquid crystal composite comprising plural volumes of liquid crystal material dispersed in a matrix material, wherein the liquid crystal material is at least partially separated from the matrix material by an interfacial material and an encapsulating material successively disposed around the liquid crystal material, comprising the steps of:

(a) forming capsules in which the liquid crystal material is successively surrounded by interfacial material and encapsulating material;

(b) dispersing the capsules in a medium in which the matrix material or a precursor thereof is present; and (c) causing the matrix material or precursor thereof to set around the capsules, to form the liquid crystal composite.

DECRIPTION OF THE PREFERRED EMBODIMENTS

Figure 1A:
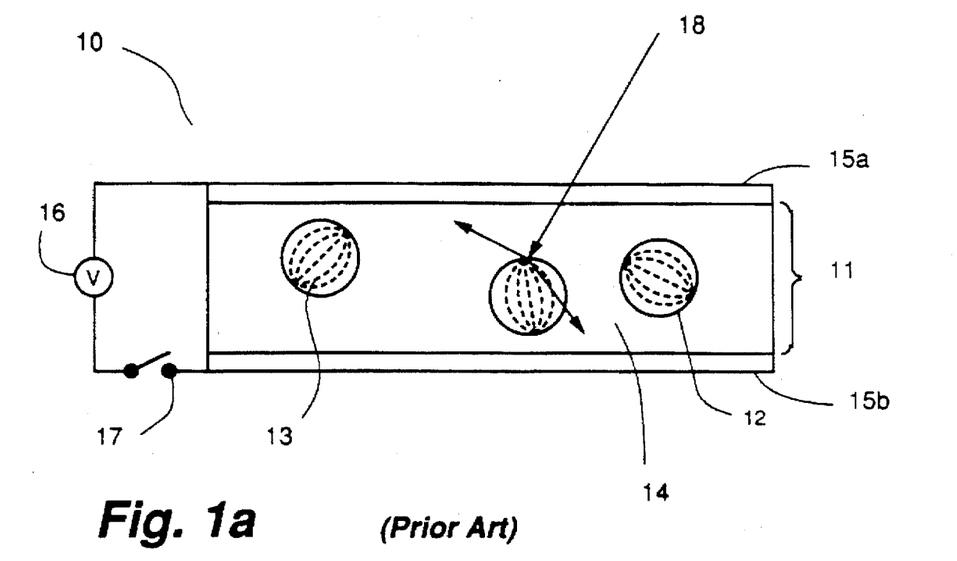
FIG. 1a–1b show a light valve made from a prior art liquid crystal composite.

FIG. 1a shows a prior art light valve made from a liquid crystal composite, such as described in Fergason '047. Light valve 10 comprises a liquid crystal composite 11 in which droplets or volumes 12 of nematic liquid crystal material 13 having a positive dielectric anisotropy are dispersed in an encapsulating material 14. Composite 11 is sandwiched between first and second electrodes 15a and 15b, made from a transparent conductor such as indium tin oxide ("ITO"). The application or not of a voltage across electrodes 15a and 15b from power source 16 is controlled by switch 17, shown here in the open position ("off-state"). As a result, no voltage is impressed across composite 11 and the electric field experienced by liquid crystal material 13 is effectively zero. Due to surface interactions, the liquid crystal molecules preferentially lie with their long axes parallel to the curved interface with encapsulating material 14, resulting in a generally curvilinear alignment within each droplet. In this particular embodiment, encapsulating material 14 also acts as a matrix to contain the droplets 12 of liquid crystal material 13. The curvilinear axes in different droplets 12 are randomly oriented, as symbolized by the differing orientations of the curvilinear patterns. Liquid crystal material 13 has an extraordinary index of refraction $n_e$ which is different from the index of refraction $n_p$ of encapsulating material 14 and an ordinary index of refraction $n_o$ which is the substantially the same as $n_p$. (Herein, two indices or refraction as said to be substantially the same, or matched, if they differ by less than 0.05, preferably less than 0.02.) Incident light ray 18 traveling through composite 11 has a high statistical probability of encountering at least one interface between encapsulating material 14 and liquid crystal material 13 in which the liquid crystal index of refraction with which it operatively interacts is $n_e$. Since $n_e$ is different from $n_p$, there is refraction, or scattering of light ray 18, both forwardly and backwardly, causing composite 11 to have a translucent or frosty appearance.

Figure 1B:
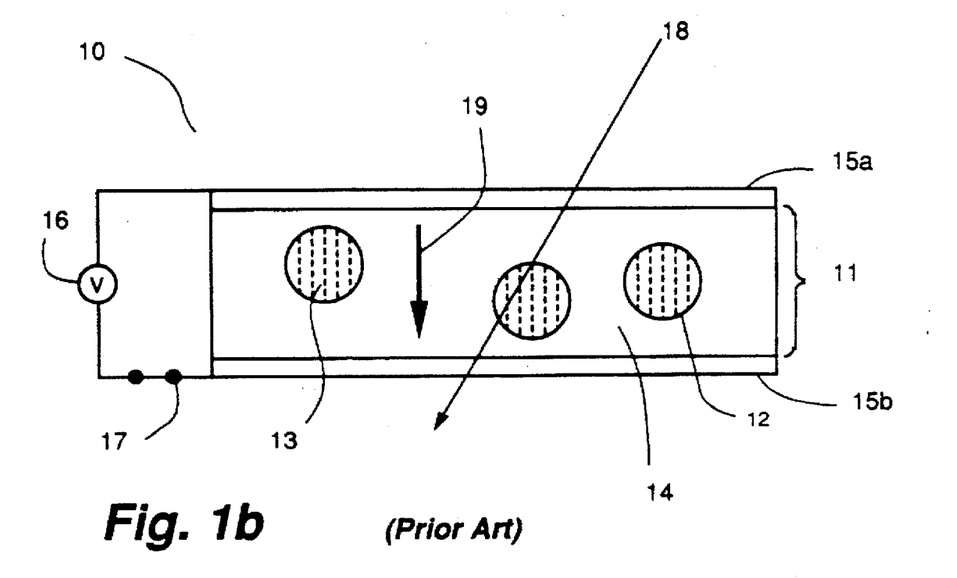

FIG. 1b shows light valve 10 in the on-state, with switch 17 closed. An electric field is applied between electrodes 15a and 15b and across composite 11, with a directionality indicated by arrow 19. Liquid crystal material 13, being positively dielectrically anisotropic, aligns parallel to the electric field direction. (The required voltage is dependent inter alia on the thickness of the composite and typically is between 3 and 50 volts.) Further, this alignment with the field occurs in each droplet 12, so that there is order among the directors from droplet to droplet, as shown symbolically in FIG. 1b. When the liquid crystal molecules are aligned in this manner, the liquid crystal index of refraction with which incident light ray 18 operatively interacts is $n_o$. Because $n_o$ is substantially the same as $n_p$, there is no scattering at the liquid crystal-encapsulating material interface. As a result, ray 18 is transmitted through composite 11, which now appears transparent. Transmission rates of at least 50%, and preferably on the order of 70% or higher may be attained.

The electro-optical performance (e.g., switching voltage, off-state scattering, switching speed, and hysteresis) of light valve 10 is dependent on the nature of the surface interactions between encapsulating material 14 and liquid crystal material 13. An encapsulating material which is desirable in respect of characteristics such as mechanical properties, ability to protect against environmental contaminants, UV stability, etc., may be undesirable in respect of its surface interactions with the liquid crystal material, for example causing the switching speed to be too slow or the switching voltage to be too high. Thus, it is desirable to be able to divorce the surface interactions from the other characteristics of the encapsulating material.

Figure 2A:
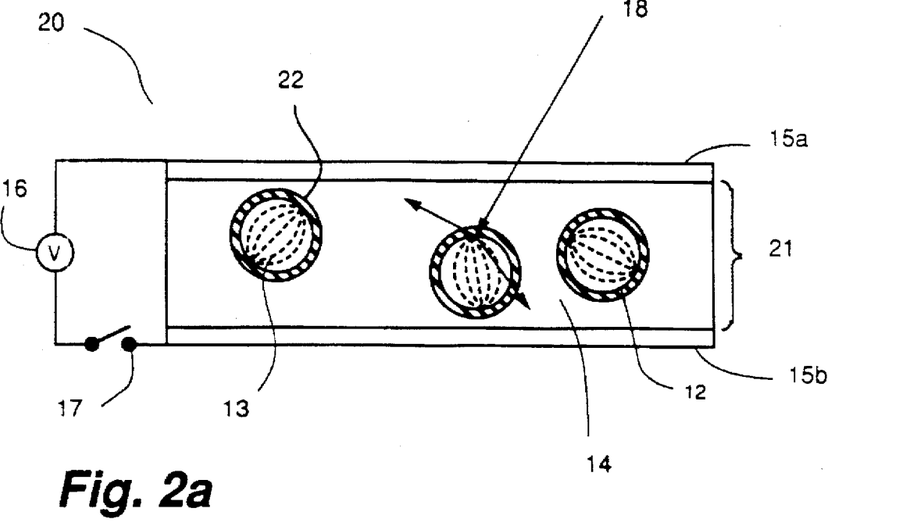
FIG. 2a–2b show a preferred light valve made from a liquid crystal composite made according to the present invention.
Figure 2B:
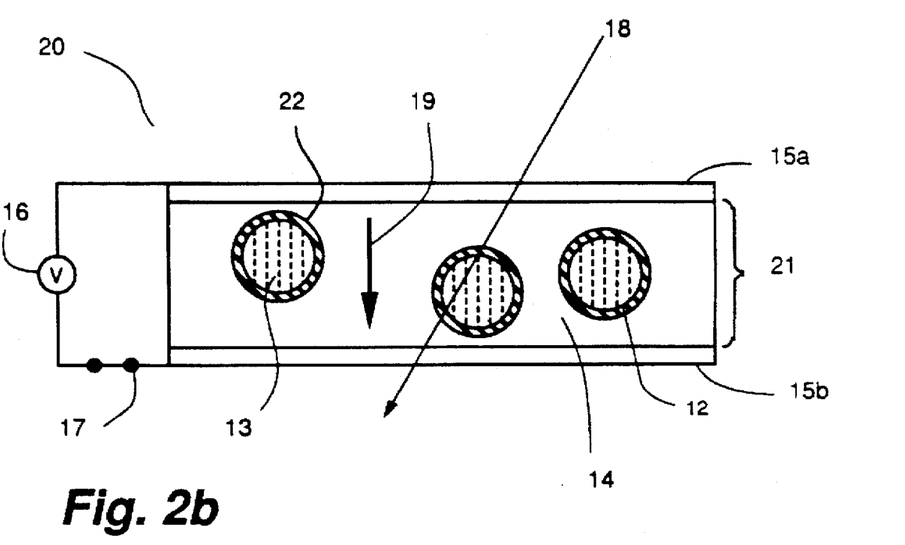

FIGS. 2a–2b (where numerals repeated from FIGS. 1a–2b denote like elements) show a light valve 20 of this invention in which this objective is achieved. Light valve 20 comprises a liquid crystal composite 21 which is similar to composite 11 of FIGS. 1a–b, except that liquid crystal material 13 is separated from encapsulating material 14 by an interfacial material 22. Light valve 20 appears frosty or translucent in the off-state (FIG. 2a) and transparent in the on-state (FIG. 2b), for the reasons given above. The surface interactions affecting the alignment of liquid crystal material 13 are predominantly with interfacial material 22 and not with encapsulating material 14. Interfacial material 22 may be selected on the basis of its interactions with liquid crystal material 13, while encapsulating material 14 may be selected on the basis of its mechanical, optical, or other properties. This way, the necessity to compromise in respect of one set or another of properties is avoided.

Matching of $n_o$ of the liquid crystal material with the index of refraction $n_p$ of the interfacial material is important only if the thickness of the layer of interfacial material is comparable to the wavelength of light. Generally the thickness is less than approximately 100 nm, much less than the wavelengths of 400 to 700 nm for visible light, so that the matching of the indices of refraction is normally not necessary. However, where the layer of interfacial material is thick or where minimizing of on-state haze is an objective (e.g., in window applications), matching of the indices of refraction is desirable. A colored visual effect may be obtained by inclusion of dyes, either pleochroic or isotropic, in the liquid crystal material.

In order to obtain the advantages of the present invention, it is not necessary that interfacial material 22 completely separates encapsulating material 14 from liquid crystal material 13. It is sufficient that interfacial material 22 at least partially separates the latter two materials, so that the switching characteristics (speed, voltage, hysteresis, etc.) of light valve 20 are characteristic of an interfacial material-liquid crystal material interface and not of an encapsulating material-liquid crystal material interface. Preferably, interfacial material 22 effectively separates encapsulating material 14 and liquid crystal material 13, by which is meant that the interfaces of liquid crystal material 13 are primarily with interfacial material 22 and not with encapsulating material 14.

In the foregoing figures the droplets or volumes 12 of liquid crystal material 13 have been shown as having a spherical shape as a matter of convenience. Other shapes are possible, for example oblate spheroids, irregular shapes, or dumbbell-like shapes in which two or more droplets are connected by channels. Also, the thickness of the layer of interfacial material 22 and the size of droplets 12 have been greatly exaggerated for clarity.

Experimental support for the deposition of interfacial material between the liquid crystal material and the encapsulating material is provided by scanning electron microscopy ("SEM"). Cross-sections in which thickness of the wall between droplets is measured show an increase in thickness after deposition and polymerizing (if such step is applicable) of the interfacial material. The increase closely corresponds to that predicted if uniform deposition of the interfacial material at the interface were to occur.

Further experimental support is provided by electro-optical data. For a composite in which the encapsulating material is poly(vinyl alcohol) ("PVA") and the interfacial material is acrylate, the operating field is 0.7 volt/µm. This value is much closer to that of a prior art composite of the type shown in FIGS. 1a–1b in which encapsulating material 14 is acrylate (about 0.5 volt/µm) than one in which encapsulating material 14 is PVA (about 6.1 volt/µm).

In the method of the present invention, an emulsion in an aqueous carrier is initially prepared, in which droplets of liquid crystal material are dispersed in encapsulating material and in the presence of the interfacial material or a precursor thereof. The interfacial material (or its precursor) is made of a material which is, under the emulsification conditions, initially soluble in the liquid crystal material or a combination of liquid crystal material and a mutually compatible solvent and hence is in a homogeneous phase together with the liquid crystal material. The interfacial material is then induced to phase separate from the liquid crystal material, by removing the mutually compatible solvent (where such is present) or by lowering the temperature (where the emulsion was originally prepared above a temperature at which the interfacial material is soluble in the liquid crystal material).

An emulsion may be prepared by rapidly agitating a mixture of liquid crystal material, interfacial material (or precursor thereof), encapsulating material, and a carrier medium, typically water. Optionally, an emulsifier, wetting agent, or other surface active agent may be added. Suitable emulsification techniques are disclosed in Fergason '047, Fergason '052, Raychem '431, and Andrews et al., U.S. Pat. No. 5,202,063 (1993), the disclosures of which are incorporated herein by reference.

Suitable encapsulating materials include poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof. A combination of an aqueous carrier medium and a encapsulating material which is soluble or colloidally dispersible in the aqueous carrier medium is particularly preferred. Although surface active agents may be employed, it is generally preferred that the encapsulating material be capable of forming capsules containing the liquid crystal material without their addition. In such cases, the encapsulating material itself should have good surface active properties (i.e., be a good emulsifier). A class of polymers having such characteristics are amphiphilic polymers containing both hydrophilic and lipophilic segments. Examples of this class include partially hydrolyzed poly (vinyl acetates) (e.g., Airvol™ 205 from Air Products), ethylene-acrylic copolymers (e.g., Adcote™, from Dow Chemical), and styrene-acrylic acid-acrylate terpolymers (e.g., Joncryl™ from S.C. Johnson).

As noted above, one may initially form the emulsion not in the presence of the interfacial material, but a precursor thereof, which may eventually be polymerized to form the interfacial material. Phase separation between the liquid crystal material and the interfacial material precursor may be effected by solvent removal or temperature change as described above. Thereafter, the interfacial material precursor is converted to the interfacial material by polymerization. Polymerization of the interfacial material precursor may be initiated by heating (where phase separation is effected by solvent removal) or, preferably, photochemically, for example by irradiation with UV light. Since the interfacial material's solubility characteristics will be different from those of the interfacial material precursor, it may not be necessary, where temperature change methods are used, to do the emulsification at a temperature above the ordinary service temperature of the final composite.

We have discovered that causing the deposition of the interfacial material precursor by lowering the temperature, followed by polymerization, unexpectedly leads to a reduction in the operating field. In the instance of a UV-curable monomer (see Example 1 below) this resulted in a reduction in the operating field from 2.7 volt/µm to 1.1 volt/µm.

Polymerization of the interfacial material precursor may be effected in a single step, or may be effected via a sequence of steps. For instance, a single exposure to UV light may not be sufficient to effect complete polymerization of the precursor because of decreasing molecular mobility as polymerization proceeds. Thus, one may effect a partial UV-light initiated polymerization of the precursor, elevate the temperature of the composite to mobilize any unpolymerized precursor molecules, and then complete the polymerization with another exposure to UV light. As used herein, "polymerizing" and "polymerization" include the reaction of the interfacial material (or its precursor) with the encapsulating material to fix the interfacial material between the liquid crystal material and the encapsulating material.

Suitable interfacial material precursors include mono or difunctional acrylates, mono or difunctional methacrylates, epoxies (for example, those cured with thiols, amines or alcohols), isocyanates (for example, those cured with alcohols or amines), and silanes. Precursors with branched alkyl units, for example 2-ethyl hexyl acrylate, are preferred.

Suitable interfacial materials are the corresponding polymers and oligomers derived from the above-listed precursors, namely acrylates, methacrylates, epoxies, polyurethanes, polyureas, siloxanes, and mixtures thereof The method of this invention may be combined with the method of copending, commonly assigned application of Reamey et al., entitled "Method of Making Liquid Crystal Composite," Ser. No. 08/217,581 (attorney's docket no. MP1425-US1), filed even date herewith, the disclosure of which is incorporated herein by reference, to make novel liquid crystal composites. One may emulsify liquid crystal material, the encapsulating material, and the interfacial material (or a precursor thereof) in a carrier medium to form an intermediate in which the liquid crystal material and interfacial material (or precursor thereof) are contained within the encapsulating material; cool to separate the interfacial material (or precursor) and deposit it between the encapsulating material and the liquid crystal material; where an interfacial material precursor was used, cure the precursor (e.g., photochemically); separate the carrier medium for example by centrifugation, to form capsules in which liquid crystal material is successively surrounded by interfacial material and encapsulating material. The capsules are then dispersed in a medium in which a matrix material (or precursor thereof) is present. The matrix material is then caused to set around the capsules to form a liquid crystal composite. By "set," it is meant that the matrix material hardens into a continuous resinous phase capable of containing dispersed therein plural volumes of liquid crystal material, with intervening layers of encapsulating and interfacial material. The matrix material may set by evaporation of a solvent or a carrier medium such as water or by the polymerization of a precursor monomer.

Suitable matrix materials include polyurethane, poly(vinyl alcohol), epoxies, poly(vinyl pyrrolidone), poly(ethylene glycol), poly(acrylic acid) and its copolymers, poly(hydroxy acrylate), cellulose derivatives, silicones, acrylates, polyesters, styrene-acrylic acid-acrylate terpolymers, and mixtures thereof.

Figure 3:
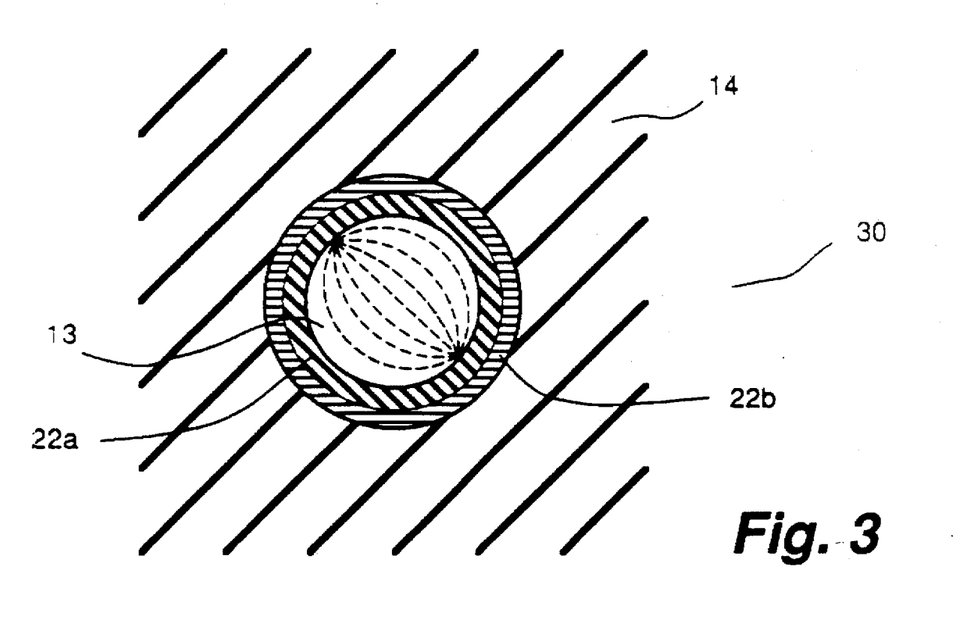
FIG. 3 shows a liquid crystal composite according to this invention.

A composite produced by this embodiment is shown in FIG. 3. Liquid crystal composite 30 comprises liquid crystal material 13 which is first surrounded by an interfacial material 22a and then by an encapsulating material 22b, and finally by matrix material 14. In this embodiment, in contrast to the embodiment shown in FIGS. 2a–2b, the encapsulating material serves an encapsulating function only and the matrix function is served by the matrix material. A preferred combination of interfacial material, encapsulating material, and matrix material is poly(2-ethylhexyl acrylate), poly(vinyl alcohol), and polyurethane, respectively. Such a composite was unexpectedly found to have especially low operating field and superior field-off scattering, in addition to a wide operational temperature range, high quality coatings, and good voltage-holding performance.

It can be advantageous to crosslink, physically entangle molecular chains, or otherwise ensure that the encapsulating material is fixed in place, so that displacement by the matrix material is minimized.

The above discussions have been in the context of nematic liquid crystals having a positive dielectric anisotropy, but other types of liquid crystals may be encapsulated by the method of this invention. One may apply the techniques of this invention to liquid crystal composites in which the liquid crystal material is a chiral nematic (also known as cholesteric) one, such as disclosed in Crooker et al., U.S. Pat. No. 5,200,845 (1993) and Jones, copending commonly assigned application entitled "Chiral Nematic Liquid Crystal Composition and Devices Comprising the Same," No. 08/139382, filed Oct. 18, 1993. Also, composites in which the liquid crystal material is a smectic, as disclosed in Pearlman et al., U.S. Pat. No. 5,216,530 (1993), are contemplated.

The practice of this invention may be further understood by reference to the following examples, which are provided by way of illustration and not of limitation. All relative amounts are by weight unless indicated otherwise.

EXAMPLE 1

Interfacial material precursor was prepared by blending 100 parts of an UV-curable acrylate (PN393™ from EM Industries) with 2 parts of 1,1,1-trimethylolpropane trimethacrylate (from Polysciences). An isotropic mixture of 100 parts liquid crystal material (TL1205, a liquid crystal material having a positive dielectric anisotropy from EM Industries) and 20 parts of the interfacial material precursor was prepared at room temperature and emulsified to a volume mean diameter of 1.89 µm in an aqueous solution of PVA (Airvol™ 205, from Air Products). After allowing it to defoam by sitting at room temperature for several hours, the emulsion was divided into four samples. Three of the samples were cooled in a 2° C. nitrogen stream for various times to cause phase separation of the interfacial material precursor. A fourth sample was held at 30° C. and served as a control. The samples were then exposed to a UV lamp at an intensity of 11 mW/cm$^2$ for 5 min without changing the temperature to polymerize the precursor.

The capsules of irradiated emulsion were then separated from the aqueous carrier medium by centrifugation and redispersed in an aqueous suspension of polyurethane latex (Neorez™, from ICI Resins) to a solids level of 40%. The emulsion was then coated onto ITO-sputtered glass, dried, and laminated with an ITO-glass counterelectrode. The amount of polyurethane matrix material in the dried film was 10% by weight. The results for the four samples are provided in Table I. $E_{90}$ is the electric field (in V/µm) required to turn a device on to 90% of its maximum transmission. The contrast ratio per thickness (CR/t) is the ratio of the saturated transmission to the transmission with no electric field applied, normalized for the thickness of the sample. CR/t gives a measure of the scattering effectiveness of the samples. Because low $E_{90}$ and high CR/t are advantageous for display applications, the low-temperature exposure prior to and during UV treatment shows a clear benefit relative to the control sample.

TABLE I

| Sample [a] | Time at 2° C. N$_2$ (min) | Thickness (µm) | $E_{90}$ (V/µm) | CR/t (µm$^{-1}$) |
|---|---|---|---|---|
| A | 0.5 | 10.7 | 1.34 | 3.61 |
| B | 5 | 11.6 | 1.13 | 3.63 |
| C | 30 | 11.3 | 1.01 | 3.64 |
| D | 0 (control) | 10.1 | 2.73 | 3.37 |

[a] Values are average of five measurements for each condition.

Figure 4:
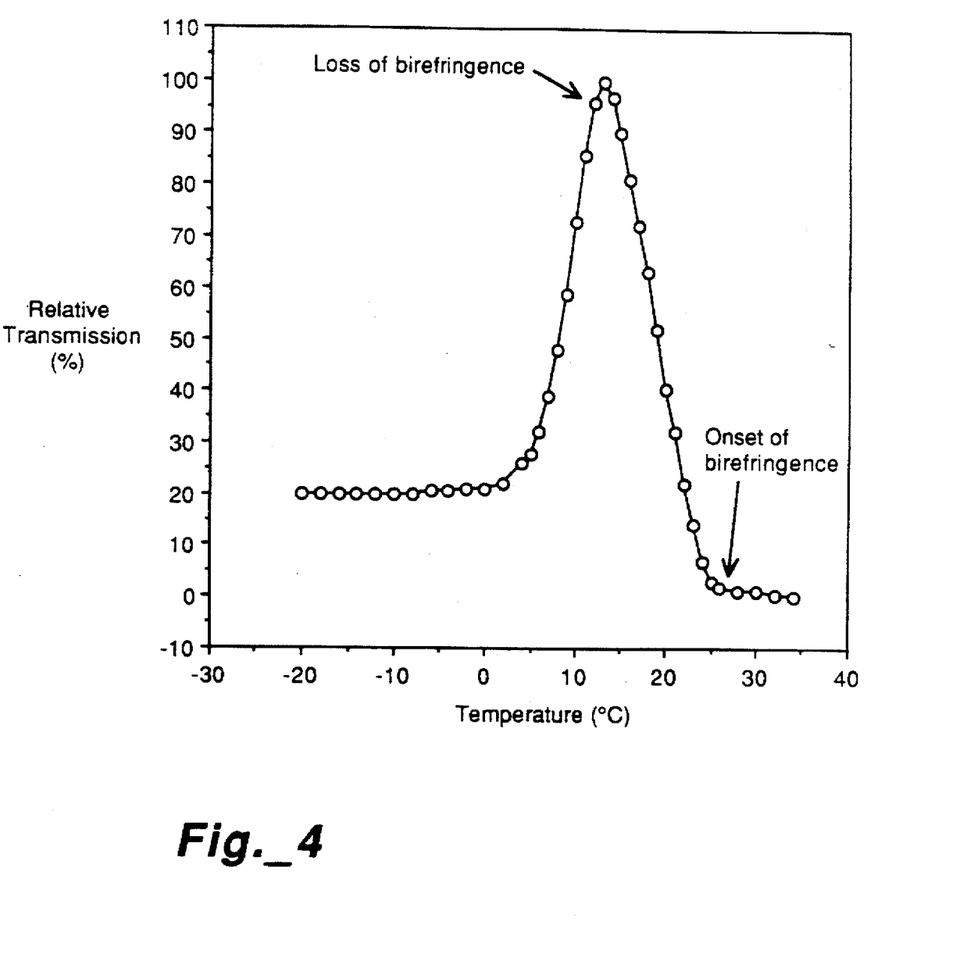
FIG. 4 shows polarized optical microscopy data for a liquid crystal composite of this invention.

Polarized optical microscopy results suggest that low temperature exposure of the emulsion prior to UV treatment causes phase separation of the interfacial material precursor from the liquid crystal material. FIG. 4 shows the experimental data for the sample prior to UV treatment mixed as described above. The aqueous emulsion with 1.9 μm volume median droplet size was placed in a temperature controlled stage between crossed polarizers in an optical microscope. At temperatures above 25° C., the liquid crystal and the interfacial material precursor form a homogeneous solution which is not birefringent, and therefore, negligible light is transmitted through the crossed polarizers. However, as the temperature is lowered, the droplets begin acquiring birefringence, as nematic domains of liquid crystals form within the droplets and the interfacial material precursor phase separates. This results in an increase in transmission. When the temperature is lowered below approximately 14° C., as seen in FIG. 4, a loss in birefringence begins to occur. We believe that this results from phase separation of the interfacial precursor to the wall of the droplets, initiating a change in the alignment of the nematic liquid crystal material to a configuration which exhibits less birefringence and therefore a lower intensity of light transmitted through the crossed polarizers. At temperatures less than 0° C., the birefringence stabilizes at a level higher than that initially present above 25° C. in the isotropic solution of liquid crystal and interfacial material precursor.

Figure 5A:
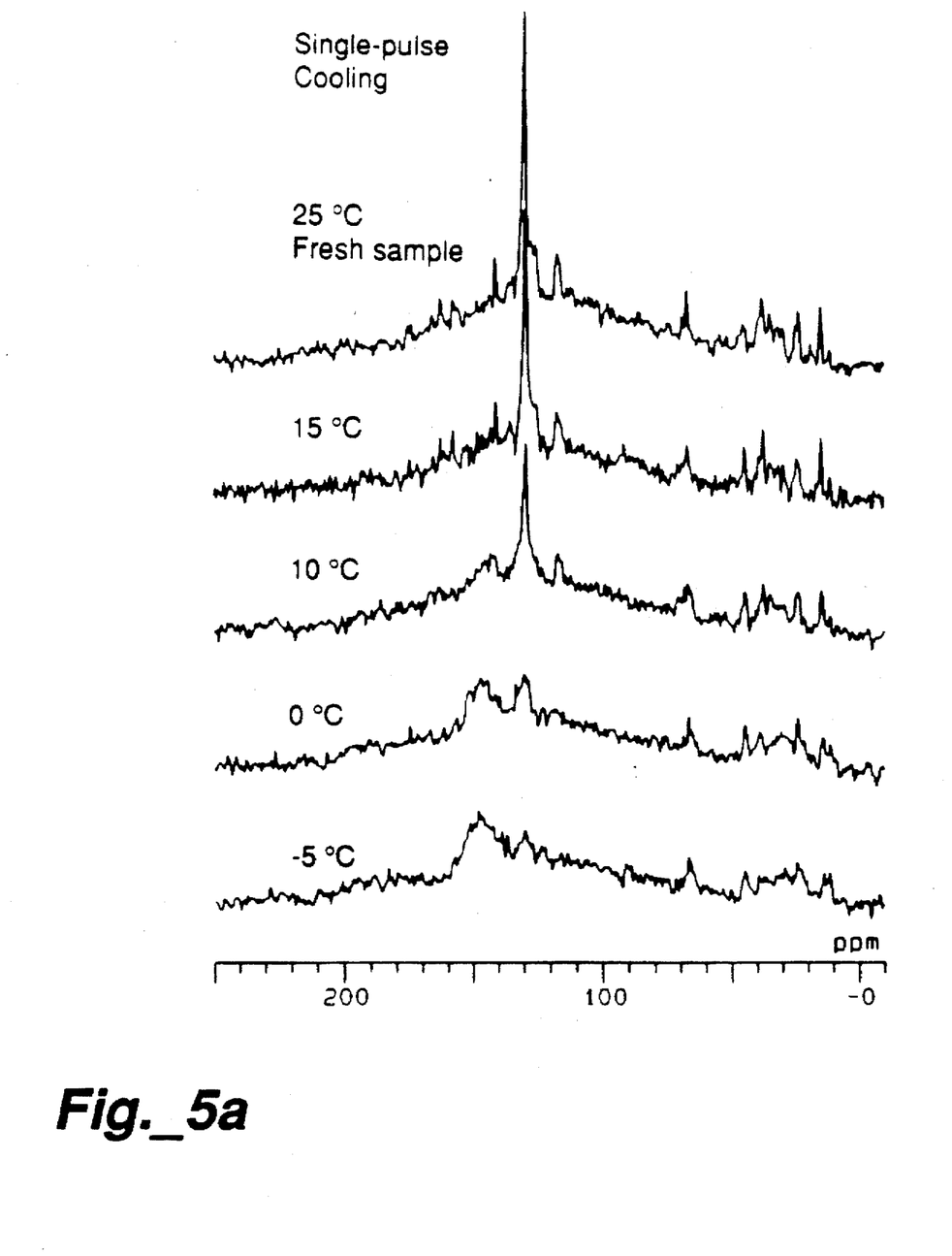
FIG. 5a–5b and 6 show carbon-13 NMR data for liquid crystal composites of this invention.
Figure 5B:
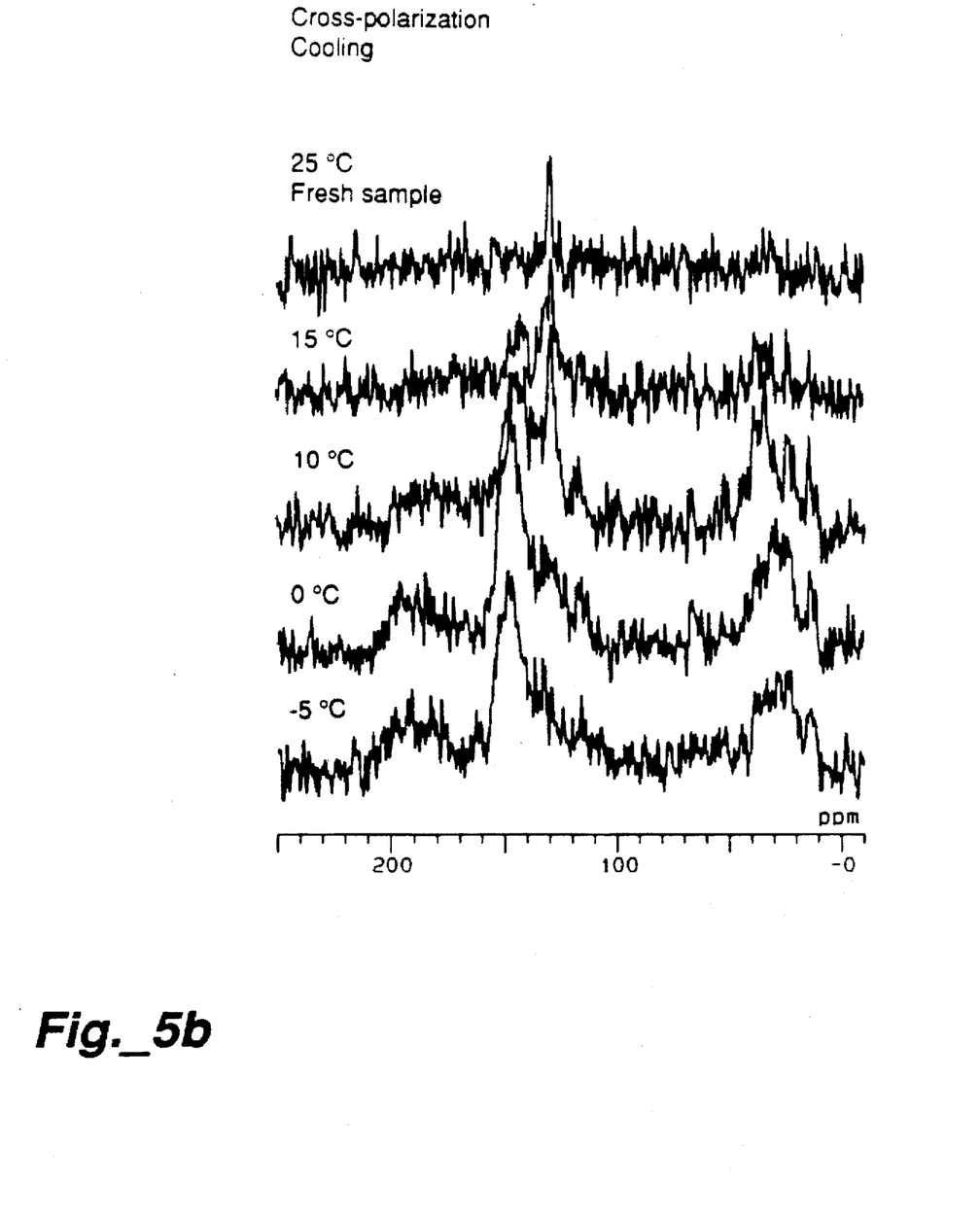
Figure 6:
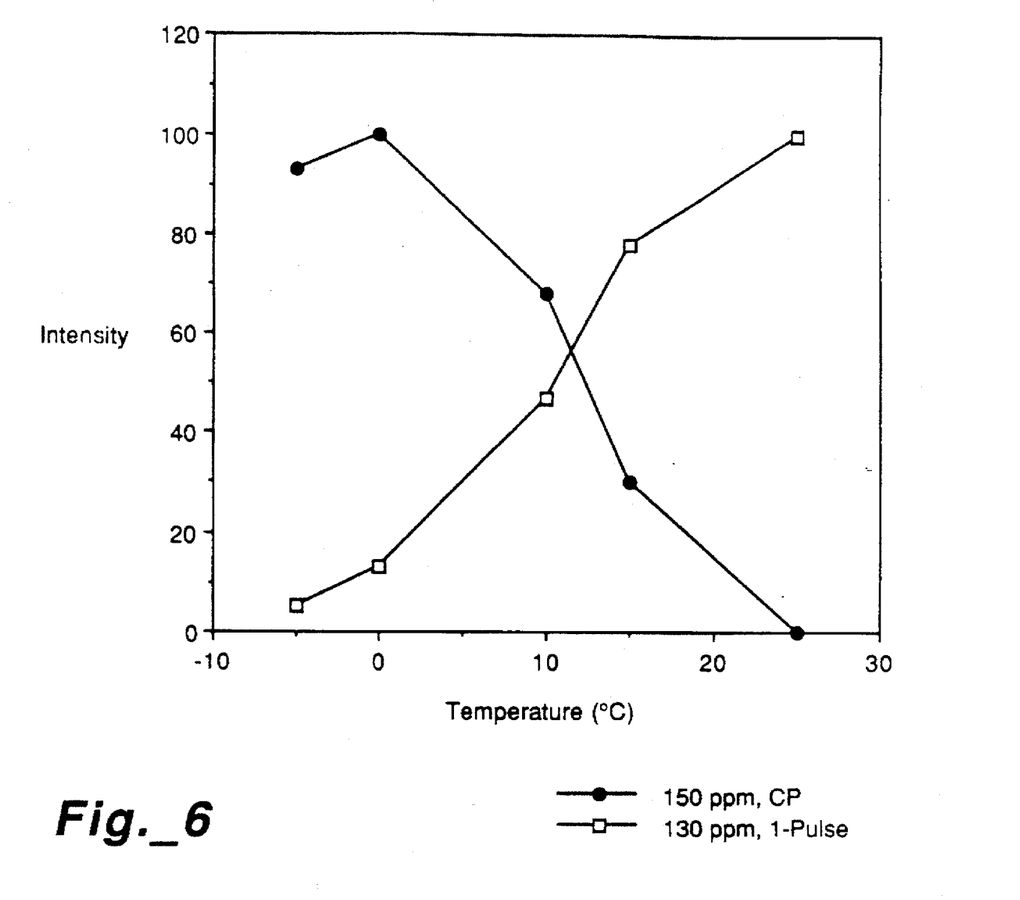

Nuclear magnetic resonance (NMR) results also indicate that low-temperature exposure of the emulsion prior to UV treatment causes phase separation of the interfacial material precursor from the liquid crystal. FIGS. 5a–5b shows 50 MHz carbon-13 spectra as a function of temperature recorded for samples of emulsion prior to UV treatment as described above. Results in FIG. 5a were accumulated using single-pulse excitation with high power proton decoupling for static samples. As is well known by those skilled in the art, these conditions preferentially enhance the mobile components of the sample, and the sharp resonance at 130 ppm arises from the aromatic carbons of the liquid crystal mesogens. In the isotropic state at 25° C., this peak is relatively intense, and as the temperature is lowered, the intensity diminishes quickly. This behavior suggests that the mesogen is becoming less mobile as the temperature is lowered. Simultaneously there is an increase in intensity in the peak at 150 ppm, which is assigned to the relatively rigid mesogens when they are in the liquid crystalline state. These data support the phase separation of the interfacial material precursor and the transition from an isotropic to a liquid crystalline state as the temperature is lowered in these emulsions. Further evidence is presented in FIG. 5b, in which cross-polarization (CP) spectra corroborate the single pulse results. Cross polarization is a way of enhancing the relatively rigid components of a sample, since it relies on dipolar interactions between protons and carbons which are not averaged by molecular motions on the kHz time scale. At 25° C. there is a relatively weak resonance at 130 ppm, corresponding to the highly mobile aromatic mesogens in the isotropic state. As the temperature is lowered, this peak decreases in intensity, and the peak at 150 ppm characteristic of the nematic liquid crystalline state grows. Phase separation of the interfacial material precursor results in the generation of this nematic component, at approximately the same temperature that birefringence is observed to arise in the optical microscopy results. NMR intensities as measured by peak height are shown in FIG. 6. The CP data correspond to the 150 ppm peak characteristic of the nematic component. The single-pulse data correspond to the 130 ppm peak characteristic of the mobile isotropic component. This temperature-abetted phase separation prior to and during the UV exposure of the emulsion yields devices with appreciably enhanced electro-optical properties.

EXAMPLE 2

This example describes the use of a solvent to compatibilize the liquid crystal material and the interfacial material, followed by phase separation induced by removal of the solvent. The interfacial material was a low molecular weight (approximately 7,400) copolymer of 2-ethylhexyl acrylate and hydroxyethyl acrylate (1:1 molar ratio), which was not soluble in the liquid crystal material at a level of 4% without the addition of a solvent (toluene).

In a small beaker was added 2.033 g of liquid crystal material (RY1007, from Chisso), 0.2185 g of a 36.7% w/w solution of the copolymer in toluene, and 4.1383 g of a 9.9% w/w aqueous solution of poly(vinyl alcohol) (Airvol™ 205, Air Products). The contents were swirled to mix and then were blended with a propeller blade for 3 min at about 4200 rpm. After filtration through a 3.0 μm filter, the volume median droplet size was 2.23 μm. The emulsion was left to stand overnight and was then coated onto ITO-coated poly(ethylene terephthalate) (ITO/PET) with a doctor blade. After standing for over 30 min, a second piece of ITO/PET was laminated onto the film to give a device. Two such devices were prepared, referred to Device I and Device II. These devices were tested electro-optically and compared to a control which contained no interfacial material. The results in Table II following show that the devices in which the interfacial material is present requires a lower field for powering.

TABLE II

| Sample[a] | Thickness (μm) | Drop size (μm) | $V_{90}$ (volt) | $E_{90}$ (V/μm) |
| --- | --- | --- | --- | --- |
| Control | 9.6 | 2.36 | 38.1 | 3.97 |
| Device I | 8.0 | 2.16 | 20.2 | 2.55 |
| Device II | 7.8 | 2.16 | 19.9 | 2.55 |

[a] Data are averaged from 5 measurements

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A liquid crystal composite comprising plural volumes of liquid crystal material dispersed in a matrix material, wherein the liquid crystal material is at least partially separated from the matrix material by an interfacial material and an encapsulating material successively disposed around the liquid crystal material, wherein the interfacial material is selected from the group consisting of acrylates, methacrylates, epoxies, polyurethanes, polyureas, and siloxanes.

2. A liquid crystal composite comprising plural volumes of liquid crystal material dispersed in a matrix material, wherein the liquid crystal material is at least partially separated from the matrix material by an interfacial material and an encapsulating material successively disposed around the liquid crystal material, wherein the encapsulating material is selected from the group consisting of poly(vinyl alcohol), poly/vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof.

3. A liquid crystal composite comprising plural volumes of liquid crystal material dispersed in a matrix material, wherein the liquid crystal material is at least partially separated from the matrix material by an interfacial material and an encapsulating material successively disposed around the liquid crystal material, wherein the matrix material is selected from the group consisting of polyurethanes, poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof.

4. A liquid crystal composite according to claim 3, wherein the interfacial material, encapsulating material, and matrix material are poly(2-ethylhexyl acrylate), poly(vinyl alcohol), and polyurethane, respectively.

5. A method of making a liquid crystal composite comprising plural volumes of liquid crystal material dispersed in a matrix material, wherein the liquid crystal material is at least partially separated from the matrix material by an interfacial material and an encapsulating material successively disposed around the liquid crystal material, comprising the steps of:

(a) forming capsules in which the liquid crystal material is successively surrounded by interfacial material and encapsulating material;

(b) dispersing the capsules in a medium in which the matrix material or a precursor thereof is present; and (c) causing the matrix material or precursor thereof to set around the capsules, to form the liquid crystal composite.

6. A liquid crystal composite according to claim 5, wherein the liquid crystal material is a nematic liquid crystal material having positive dielectric anisotropy.

7. A liquid crystal composite according to claim 6, wherein the liquid crystal material contains a pleochroic dye.

8. A liquid crystal composite according to claim 5, wherein the interfacial material is selected from the group consisting of acrylates, methacrylates, epoxies, polyurethanes, polyureas, siloxanes, and mixtures thereof.

9. A liquid crystal composite according to claim 5, wherein the encapsulating material is selected from the group consisting of poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof.

10. A liquid crystal composite according to claim 5, wherein the matrix material is selected from the group consisting of polyurethane, poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof.

11. A liquid crystal composite according to claim 5, wherein the interfacial material, encapsulating material, and matrix material are poly(2-ethylhexyl acrylate), poly(vinyl alcohol), and polyurethane, respectively.

12. A liquid crystal composite according to claim 5, wherein the encapsulating material is fixed in place by crosslinking or physical entanglement of molecular chains.

* * * * *